United States Patent [19]
Braasch

[11] Patent Number: 5,754,568
[45] Date of Patent: May 19, 1998

[54] POSITION MEASURING SYSTEM

[75] Inventor: Jan Braasch, Altenmarkt, Germany

[73] Assignee: Dr. Johannes Heidenhain GmbH, Traunreut, Germany

[21] Appl. No.: 795,230

[22] Filed: Feb. 10, 1997

[30] Foreign Application Priority Data

Feb. 10, 1996 [DE] Germany ............... 196 04 871.0

[51] Int. Cl.$^6$ ............................................. G06F 11/06
[52] U.S. Cl. ................................................. 371/48
[58] Field of Search ............... 371/48, 53, 57.1, 371/67.1; 235/375; 250/231.18, 257 G

[56] References Cited

U.S. PATENT DOCUMENTS

| | | | |
|---|---|---|---|
| 5,023,434 | 6/1991 | Lanfer et al. | 235/375 |
| 5,068,529 | 11/1991 | Ohno et al. | 250/231.18 |

FOREIGN PATENT DOCUMENTS

| | | | |
|---|---|---|---|
| 1 287 630 | 1/1969 | Germany . | |
| 80 25 487 | 6/1981 | Germany | G01D 5/249 |
| 43 09 863 | 6/1994 | Germany | H03M 1/22 |
| 4-1522 | 1/1992 | Japan | G01D 5/249 |

OTHER PUBLICATIONS

W. Wesley Peterson, Prüfbare und korrigierbare Codes, 1967, pp. 184–215, Germany.

*Primary Examiner*—Vincent P. Canney
*Attorney, Agent, or Firm*—Brinks Hofer Gilson & Lione

[57] ABSTRACT

A position measuring system for increasing operational dependability, wherein the absolute position is generated by scanning a chain code and erroneously scanned code words are detected and excluded from further processing. A plurality of codes are scanned at areas of the code track which are distanced from each other and are supplied to an error check device.

34 Claims, 2 Drawing Sheets

POSITION MEASURING SYSTEM

FIELD OF THE INVENTION

The invention relates to a position measuring system for determining the absolute position of a scanning unit which can be displaced relative to a measurement representation in the measuring direction.

BACKGROUND OF THE INVENTION

A known position measuring system has been described in Japanese Patent Publication JP 4-1522 A. In this publication, the position measuring system is represented in FIG. 2. The measurement representation consists of a code track with code elements arranged one behind the other in the measuring direction. FIG. 2 of the Japanese Patent Publication JP 4-1522A illustrates the position measuring system. The code elements are provided in a pseudo-random distribution, so that a defined number of successive code elements form a code word and all code elements form a continuous sequence of different code words. Such a code is also called a chain code. The measurement representation is scanned by several groups of detector elements in order to simultaneously scan several complete code words which do not overlap each other. These code words are then supplied to an error check device for detecting reading errors. In the error check device, the distances between the actual positions of the code words are compared with the distances between the detector groups. If the two distances do not match, a warning signal is triggered. A disadvantage of this position measuring system is that it is only possible to detect whether code words have been erroneously read. The system cannot detect which particular code words have been erroneously read.

SUMMARY OF THE PRESENT INVENTION

The present invention provides a position measuring system with a high degree of operational dependability. In particular, the device of the present invention detects errors in the scanned section of the code track, and removes erroneous code words. The probability that at least one code word is correctly read in the course of scanning several code words which are completely independent of each other, is very great, thereby increasing the operational dependability of the position measuring system.

In the presently preferred embodiment, the position measuring system is used to determine the absolute position of a scanning unit which can be displaced relative to a measurement representation in a measuring direction. The system includes a measurement representation having a code track with code elements following each other in the measuring direction and forming a sequence of different code words; a scanning unit having a plurality of detector elements following each other in the measuring direction for simultaneously scanning several complete, non-overlapping code words; and an error check device receiving the code words or decoded code words and checking the code words or decoded code words for errors, whereby a correct code word is recognized from several simultaneously detected code words and is used to determine the instantaneous absolute position, and whereby code words recognized as being erroneous are excluded from further processing.

DETAILED DESCRIPTION OF THE PRESENTLY PREFERRED EMBODIMENTS

Figure 1:
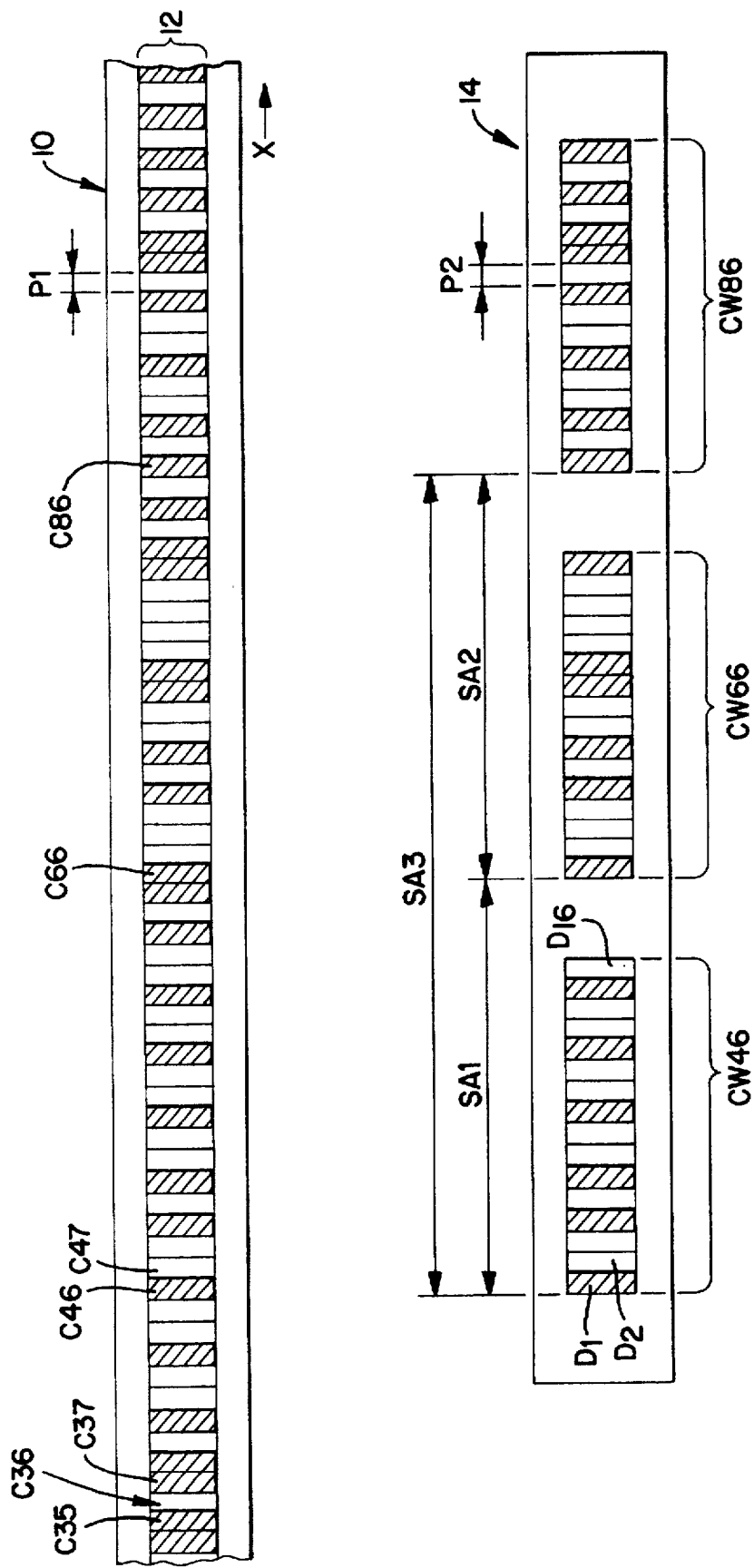
FIG. 1 shows a preferred embodiment of a portion of a measurement representation and scanning unit of the present invention.

A preferred embodiment of a portion of a measurement representation 10 of the present invention is shown in FIG. 1. The measurement representation 10 includes a code track 12 having code elements C. Some code elements such as C35, C37, C46, C66 and C86 are shown by hatched lines and are preferably opaque. Other code elements such as code element C36 is transparent. The code elements preferably have a width P1 and sequentially follow each other in the measurement direction X. The code elements C form a chain code, i.e., they are pseudo-randomly distributed in the measuring direction X and form a continuous sequence of different code words. A particularly simple and space-saving construction of an absolute position measuring system is possible using chain codes.

In the method of the present invention, the measurement representation 10 is binary scanned with a binary value 0 assigned to each opaque code element C and a binary value 1 assigned to each transparent code element C. However, the code elements C can also be designed so they can be scanned magnetically or capacitively. Such chain codes are extensively described in U.S. Pat. No. 5,068,529, which is hereby specifically incorporated by reference.

Also shown in FIG. 1 is a portion of a scanning unit 14 for scanning the code track 12 of the measurement representation 10. The scanning unit 14 can be displaced relative to the measurement representation 10 and includes a plurality of detector elements D arranged one behind the other in the measuring direction X. Preferably, these detector elements D are light-sensitive regions of a photoelectric diode array, such as a charge-coupled device (CCD) array, that sense the transparent and opaque regions of the code track 12. As shown in FIG. 1, if an opaque region of code track 12, such as C46, is scanned by a detector element D, such as detector element D1, no light is sensed by the detector element D which results in a negligible output voltage and a binary value 0 assigned to the region of the detector element D. If a transparent region of code track 12, such as C47, is scanned by a detector element D, such as detector element D2, light is sensed by the detector element D which results in a large output voltage and a binary value 1 assigned to the region of the detector element D. The distance P2 between the detector elements D is equal to the width P1 of a code element C. However, the invention can also be employed if the width P1 of a code element C deviates from P2, in particular if P1 is a multiple of P2.

The scanning unit 14 has at least a sufficient number of detector elements D to read three complete, non-overlapping code words CW. In the presently preferred embodiment, a code word CW consists of 16 bits, and the distance between two code words is 4 bits. The scanning area is 56 bits in length (i.e., 48 bits of code word and 8 bits of spacing between code words).

Figure 2:
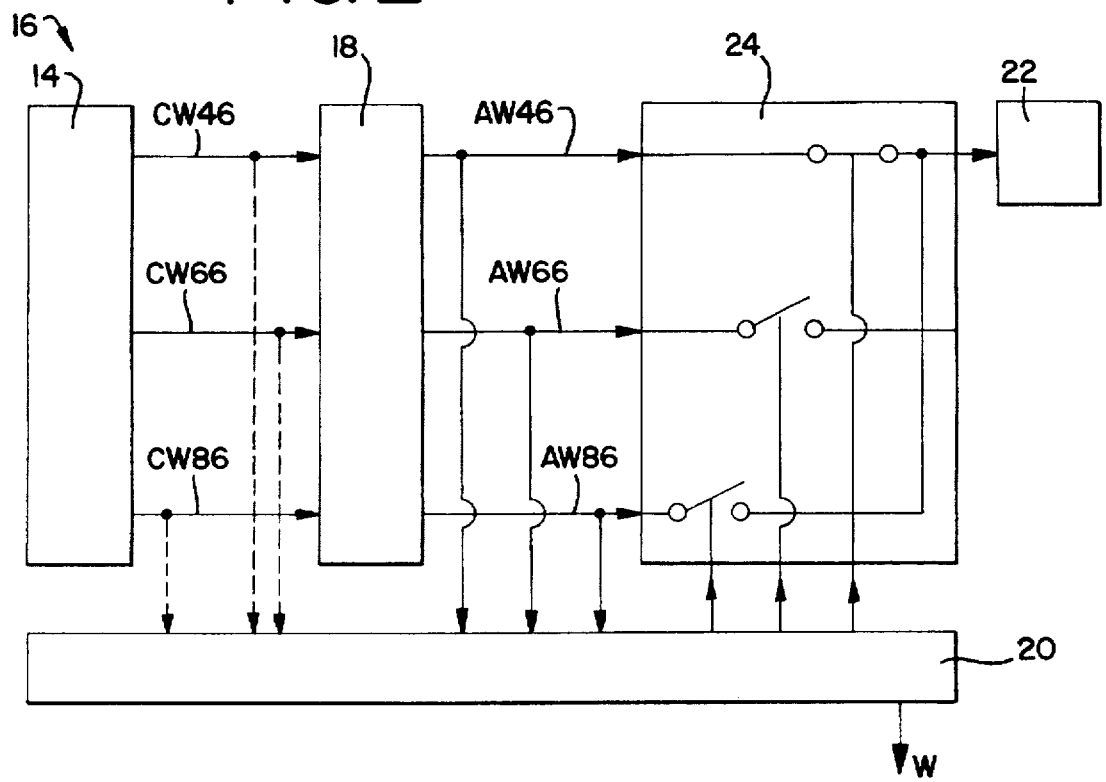
FIG. 2 shows a schematic representation of a first preferred embodiment of the device of the present invention.

FIG. 2 shows a schematic representation of a first preferred embodiment of the device of the present invention. The device 16 includes a scanning unit 14, a decoding device 18, an error check device 20, an electronic follow up device 22 and a selector circuit 24. Scanning unit 14 generates three code words CW46, CW66 and CW86 at a common scanning time at locations on the code track 12 as shown, for example, in FIG. 1. The code words are supplied to a decoding device 18 for determining the absolute positions AW46, AW66 and AW86 of each code word CW46, CW66 and CW86, respectively. Decoding device 18 can be a memory in the form of an EPROM table, whose addresses are the code words CW46, CW66 and CW86. In accordance with the invention, the absolute positions AW46, AW66 and AW86 derived from code words CW46, CW66 and CW86 are supplied to the error check device 20. Alternatively, the code words CW46, CW66 and CW86 can be supplied to the error check device 20 as shown by dotted lines in FIG. 2. Preferably, error check device 20 is a microprocessor. Error check device 20 calculates all possible differences, i.e., the detected actual distances IA1, IA2 and IA3 of the code words CW46, CW66, CW86, and compares them with the set known distances SA1, SA2 and SA3 (FIG. 1). The set distances SA1, SA2, SA3 result from the arrangement of the detector elements D (FIG. 1). The set distance SA1 between the code word CW46 and the code word CW66 and the set distance SA2 between the code word CW66 and the code word CW86 is preferably 20 bits, corresponding to the length of a code word plus the spacing of 4 bits. The set distance SA3 between the code word CW46 and the code word CW86 is preferably 40 bits, corresponding to the length of two code words plus two spacings of 4 bits. If corresponding distances IA and SA do not match, the error check device 20 will issue a warning signal W indicating that an erroneous code was detected.

In the presently preferred embodiment as shown in FIG. 2, the result of the comparison indicates that code words CW66 and CW86 have been erroneously read. These code words are blocked from further processing by selector circuit 24. Code word CW46, on the other hand, was correctly read and selector circuit 24 releases it to the electronic follow-up device 22 for further processing. Preferably, selector circuit 24 is a component of a processor that selects which code words to pass to the electronic follow-up device 22 for further processing. In FIG. 2, the selector circuit is shown as a switching mechanism to illustrate the selection function. Electronic follow-up device 22 can be, for example, a display unit that displays the measured position or a drive controller, such as a numerically controlled controller, that moves a machine part.

Table 1 illustrates how the selector circuit 24 blocks (code word invalid) or releases (code word valid) defined code words CW46 to CW86 for further processing as a function of the comparison results:

TABLE 1

| Result Possibility | IA1 = SA1 | IA2 = SA2 | IA3 = SA3 | CW46 | CW66 | CW86 |
| --- | --- | --- | --- | --- | --- | --- |
| 1 | Yes | No | No | valid | valid | invalid |
| 2 | No | Yes | No | invalid | valid | valid |
| 3 | No | No | Yes | valid | invalid | valid |
| 4 | Yes | Yes | No | invalid | invalid | invalid |
| 5 | No | Yes | Yes | invalid | invalid | invalid |
| 6 | Yes | No | Yes | invalid | invalid | invalid |
| 7 | Yes | Yes | Yes | valid | valid | valid |
| 8 | No | No | No | invalid | invalid | invalid |

It can be seen from Table 1 that of the three code words CW46, CW66 and CW86, any one can be detected as invalid, and at least one of the remaining two code words can still be supplied to the electronic follow-up device 22 as a correct code word for further processing without the measuring operation being interrupted. The higher the number of non-overlapping code words CW that are scanned, the higher the number of erroneous code words that can occur while the position measuring system maintains the ability to identify valid code words and supply them for further processing. Further, the more code words CW that are simultaneously scanned, the more likely it is that at least one of the code words CW is recognized as being correct, thereby increasing the operational dependability of the system. It has been shown that by scanning four code words it is possible to considerably increase the operational dependability of the system while maintaining a reasonable expense, since it is already possible to let two code words be erroneous.

Figure 3:
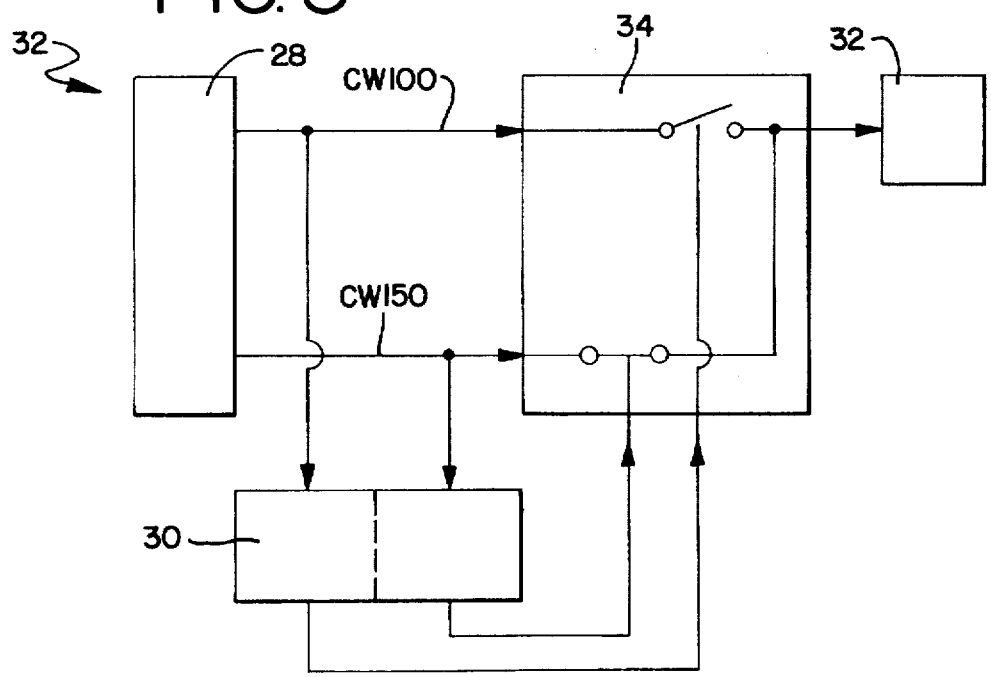
FIG. 3 shows a schematic representation of a second preferred embodiment of the device of the present invention.

FIG. 3 shows a schematic representation of a second preferred embodiment of the device of the present invention. Similar to device shown in FIG. 2, the device 32 includes a scanning unit 28, an error check device 30, an electronic follow up device 32 and a selector circuit 34. At least two non-overlapping code words CW100 and CW150 are read off the code track 12 (FIG. 1) by means of the scanning unit 28. The code of the code track 12 (FIG. 1) contains control bits, for example, so that erroneously read out code word CW100 is detected in accordance with known rules. The two code words CW100 and CW150 are supplied to an error check device 30 in which each code word CW100 and CW150 is independently checked in accordance with known rules. Code word CW100, recognized as being erroneous, is removed from further processing by the selector circuit 34, while one of the correct code word CW150 is supplied to the electronic follow up device 32. In the simplest case, the error check of a code word CW100 or CW150 is performed by a known parity check or by scanning of redundant bits in accordance with German Patent Publication Nos. DE 12 87 630 C or DE 80 25 487 U1. Rules for checking a code word CW100 or CW150 are known. Such rules are disclosed, for example, in the book by W. Wesley Peterson entitled "Prhfbare und korrigierbare Codes" [Codes Which can Be Checked and Corrected], Oldenbourg Verlag, publishers, 1967, particularly on pages 184 to 215. In a manner not shown, it is also possible to supply decoded code words to the error check device 30 in place of the code words CW100 and CW150.

The code words or absolute positions which have been supplied as being correct to the electronic follow-up device 22,32 are corrected as a function of the set position of the detector elements D (FIG. 1). Referring to FIG. 2, if, for example, the correct absolute position is obtained from the first ten detector elements D, and these detector elements D are used as the reference position, the code word CW46 can be supplied directly or decoded to the electronic follow-up device 22 (FIG. 2). However, if in this case the code word CW86 is recognized as being correct, it is necessary to correct the code word CW86 by the distance SA3. This correction can be performed, for example, by subtracting SA1 from CW66 or by subtracting SA3 from CW86. A further option for taking the distances SA1 and SA3 into consideration with respect to the selected reference position consists of using the decoding device 18 in such a way that in an error-free case AW46=AW66=AW86. This is achieved, for example, in the decoding table for the code word CW66 by reading out CW66 displaced by twenty places with respect to the decoding table of the code word CW46, and for the code word CW86 by reading out CW86 displaced by forty places with respect to the decoding table of the code word CW46.

The invention can be used in a particularly advantageous manner when scanning a single-track chain code where each displacement of the scanning unit 14 by a single code element C results in different code words. The invention can also be used in connection with absolute position measuring devices in which a single-track block code is present. Further, the invention can be employed for longitudinal and angular measuring systems. For fine resolution, an incremental track can be disposed next to the code track. It is therefore intended that the foregoing detailed description be regarded as illustrative rather than limiting and that it be understood that it is the following claims, including all equivalents, which are intended to define the scope of this invention.

What is claimed is:

1. A position measuring system for determining the absolute position of a scanning unit which can be displaced relative to a measurement representation in a measuring direction comprising:
    a measurement representation having a code track with code elements following each other in the measuring direction and forming a sequence of different code words;
    a scanning unit having a plurality of detector elements following each other in the measuring direction for simultaneously scanning several complete, non-overlapping code words; and
    an error check device receiving said code words or decoded code words and checking said code words or decoded code words for errors, whereby a correct code word is recognized from several simultaneously detected code words and is used to determine the instantaneous absolute position, and whereby code words recognized as being erroneous are excluded from further processing.

2. The position measuring system of claim 1 wherein the code elements of the code track have a pseudo-random distribution in the form of a chain code and form a continuous sequence of different code words.

3. The position measuring system of claim 1 further comprising a selector circuit that releases said correct code word for further processing and excludes said code words detected as being erroneous.

4. The position measuring system of claim 2 further comprising a selector circuit that releases said correct code word for further processing and excludes said code words detected as being erroneous.

5. The position measuring system of claim 1 wherein at least three different said non-overlapping code words having predetermined set distances from each other are simultaneously scanned, and actual distances of said code words are determined in the error check device and compared with the set distances.

6. The position measuring system of claim 2 wherein at least three different said non-overlapping code words having predetermined set distances from each other are simultaneously scanned, and actual distances of said code words are determined in the error check device and compared with the set distances.

7. The position measuring system of claim 3 wherein at least three different said non-overlapping code words having predetermined set distances from each other are simultaneously scanned, and actual distances of said code words are determined in the error check device and compared with the set distances.

8. The position measuring system of claim 4 wherein at least three different said non-overlapping code words having predetermined set distances from each other are simultaneously scanned, and actual distances of said code words are determined in the error check device and compared with the set distances.

9. The position measuring system of claim 5, wherein all possible actual distances of all said code words are compared with the set distances.

10. The position measuring system of claim 6, wherein all possible actual distances of all said code words are compared with the set distances.

11. The position measuring system of claim 7, wherein all possible actual distances of all said code words are compared with the set distances.

12. The position measuring system of claim 8, wherein all possible actual distances of all said code words are compared with the set distances.

13. The position measuring system of claim 1 wherein at least two different non-overlapping said code words are simultaneously scanned, and wherein each said code word is independently checked for errors in the error check device.

14. The position measuring system of claim 2 wherein at least two different non-overlapping said code words are simultaneously scanned, and wherein each said code word is independently for errors in the error check device.

15. The position measuring system of claim 3 wherein at least two different non-overlapping said code words are simultaneously scanned, and wherein each said code word is independently for errors in the error check device.

16. The position measuring system of claim 4 wherein at least two different non-overlapping said code words are simultaneously scanned, and wherein each said code word is independently for errors in the error check device.

17. The position measuring system of claim 1 wherein all said detector elements for detecting said code words are embodied in a single CCD array.

18. The position measuring system of claim 1 wherein all said detector elements for detecting said code words are embodied in a photoelectric diode cell.

19. The position measuring system of claim 5 wherein a warning signal is issued as a function of a number of said code words recognized as being erroneous.

20. The position measuring system of claim 6 wherein a warning signal is issued as a function of a number of said code words recognized as being erroneous.

21. The position measuring system of claim 7 wherein a warning signal is issued as a function of a number of said code words recognized as being erroneous.

22. The position measuring system of claim 8 wherein a warning signal is issued as a function of a number of said code words recognized as being erroneous.

23. The position measuring system of claim 9 wherein a warning signal is issued as a function of a number of said code words recognized as being erroneous.

24. The position measuring system of claim 10 wherein a warning signal is issued as a function of a number of said code words recognized as being erroneous.

25. The position measuring system of claim 11 wherein a warning signal is issued as a function of a number of said code words recognized as being erroneous.

26. The position measuring system of claim 12 wherein a warning signal is issued as a function of a number of said code words recognized as being erroneous.

27. A method of determining the absolute position of a second object displaceable relative to a first object in a measuring direction, the method comprising the steps of:
    providing a measurement representation disposed on the first object having a code track formed by code elements following each other in the measuring direction wherein a sequence of different code words is formed by the code elements;
    simultaneously scanning several code words having predetermined set distances from each other using a scanning unit disposed on the second object, the scanning unit having a plurality of detector elements following each other in the measuring direction and generating at least two code word signals; and evaluating said code word signals for errors;

excluding code word signals evaluated as having errors from further processing; and using code word signals evaluated as not having errors to determine the absolute position of the second object.

28. The method of claim 27 wherein the step of evaluating said code word signals for errors further includes determining actual distances of said code word signals from each other, and comparing said set distances with said actual distances.

29. The method of claim 27 further comprising the step of generating a warning signal upon evaluating a code word signal as having errors.

30. The method of claim 29 wherein said warning signal is not generated until a predetermined number of code word signals have been evaluated as having errors.

31. A method of determining the absolute position of a second object displaceable relative to a first object in a measuring direction, the method comprising the steps of:

scanning a measurement representation disposed on the first object with a scanning unit disposed on the second object wherein the measurement representation has a code track formed by code elements sequentially arranged in the measuring direction wherein different code words having predetermined set distances from each other are formed by groups of code elements wherein at least two code words are simultaneously scanned by the scanning unit;

generating at least two code word signals from the scanned at least two code words;

evaluating the code word signals for errors;

excluding code word signals evaluated as having errors; and using code word signals evaluated as not having errors to determine the absolute position of the second object.

32. The method of claim 31 wherein the step of evaluating said code word signals for errors further includes determining actual distances of said code word signals from each other, and comparing said set distances with said actual distances.

33. The method of claim 31 further comprising the step of generating a warning signal upon evaluating a code word signal as having errors.

34. The method of claim 33 wherein said warning signal is not generated until a predetermined number of code word signals have been evaluated as having errors.

* * * * *

UNITED STATES PATENT AND TRADEMARK OFFICE
CERTIFICATE OF CORRECTION

PATENT NO. : 5,754,568
DATED : May 19, 1998
INVENTOR(S) : Jan Braasch

Page 1 of 1

It is certified that error appears in the above-identified patent and that said Letters Patent is hereby corrected as shown below:

Claims 14, 15, and 16,
Line 4, after "independently" insert -- checked --.

Signed and Sealed this

Second Day of October, 2001

Attest:

*Nicholas P. Godici*

NICHOLAS P. GODICI
*Attesting Officer*    *Acting Director of the United States Patent and Trademark Office*